United States Patent [19]

Bursel

[11] Patent Number: 5,251,886
[45] Date of Patent: Oct. 12, 1993

[54] SEMI-ELLIPTICAL SPRING SUSPENSION WITH AUTOMATIC SPRING RATE VARYING CAPACITY

[76] Inventor: Joseph S. Bursel, 3258 Southfield La., Sarasota, Fla. 34239

[21] Appl. No.: 882,908

[22] Filed: May 14, 1992

[51] Int. Cl.[5] ............................................. B60G 11/02
[52] U.S. Cl. .................................... 267/229; 267/41; 267/44; 267/260; 267/243; 267/262; 280/699; 280/718; 280/688
[58] Field of Search ........................ 267/44, 45-46, 267/41, 36.1, 47, 49, 48, 260, 262, 265, 267, 268, 269, 270, 271, 229, 242, 243, 246, 158, 160, 228-258, 148-149; 280/718-720, 688, 699

[56] References Cited

U.S. PATENT DOCUMENTS

| | | |
|---|---|---|
| 111,103 | 1/1871 | Britton . |
| 850,073 | 4/1907 | Stolp ................................. 267/233 |
| 1,297,325 | 3/1919 | Coleman . |
| 1,350,110 | 8/1920 | Oltsch ............................... 267/245 |
| 1,383,592 | 7/1921 | Anthes .............................. 267/243 |
| 1,424,475 | 8/1922 | Hasemeier ........................ 267/233 |
| 1,448,224 | 3/1923 | Luce .................................. 267/234 |
| 1,623,845 | 4/1927 | Kogstrom ......................... 267/262 |
| 1,761,965 | 6/1930 | Blackmore ....................... 267/262 |
| 1,766,924 | 6/1930 | Moorhouse ................. 267/260 X |
| 1,774,503 | 9/1930 | Davis ................................... 267/44 |
| 1,789,845 | 1/1931 | Shore ................................ 267/243 |
| 1,929,796 | 10/1933 | Stolte .......................... 267/262 X |
| 2,009,548 | 7/1935 | Goin et al. . |
| 2,098,522 | 11/1937 | Simning . |
| 2,279,154 | 4/1942 | Wood ................................. 267/232 |
| 2,411,337 | 11/1946 | Ridgway ........................... 267/44 |
| 2,991,993 | 7/1961 | Harbers et al. ............ 267/269 X |
| 3,038,715 | 6/1962 | Davidson et al. ............... 267/233 |
| 3,288,456 | 11/1966 | Paioletti et al. ............. 267/48 X |
| 3,680,850 | 8/1972 | Preddy, Jr. ...................... 267/269 |
| 3,693,964 | 9/1972 | McGee .............................. 267/262 |
| 3,799,562 | 3/1974 | Hinchliff ................... 267/262 X |
| 4,027,898 | 6/1977 | Steen . |
| 4,313,618 | 2/1982 | Robinson . |
| 4,322,061 | 3/1982 | Masser ............................. 267/269 |
| 4,505,460 | 3/1985 | Le Gallais ...................... 267/149 |
| 4,557,500 | 12/1985 | Collard et al. ................. 267/149 |
| 4,562,998 | 1/1986 | Ward ........................... 267/148 X |
| 4,611,793 | 9/1986 | Nishiyama et al. ....... 267/149 X |
| 4,681,343 | 7/1987 | Gallet et al. . |
| 4,750,718 | 6/1988 | Nickel ......................... 267/149 X |
| 4,763,921 | 8/1988 | Steiner ....................... 267/262 X |
| 4,771,997 | 9/1988 | Haldenwanger et al. ....... 267/260 |
| 4,887,802 | 12/1989 | Wilcox ....................... 267/262 X |
| 4,969,634 | 11/1990 | Bellingham ................ 267/262 X |

FOREIGN PATENT DOCUMENTS

| | | | |
|---|---|---|---|
| 852814 | 3/1940 | France ............................. 267/243 |
| 430470 | 8/1967 | Switzerland ................... 280/718 |

*Primary Examiner*—Douglas C. Butler
*Attorney, Agent, or Firm*—Jacobson, Price, Holman & Stern

[57] ABSTRACT

A semi-elliptical spring suspension system is provided in conjunction with a trailing arm and the suspension system may be readily mounted from the longitudinal side members of a vehicle frame. The suspension system semi-elliptical spring comprises a composite spring whose spring rate increases dramatically as the load on the spring is increased and the suspension system is constructed in a manner which isolates the semi-elliptical spring from twisting forces and wind up torque.

11 Claims, 2 Drawing Sheets

2

SEMI-ELLIPTICAL SPRING SUSPENSION WITH AUTOMATIC SPRING RATE VARYING CAPACITY

BACKGROUND OF THE INVENTION

1. Field of the Invention

This invention relates to a semi-elliptical spring which can taper in thickness and has its major dimension end rigidly attached to a vehicle chassis. The convex side of the spring opposes a flat abutment surface away from which the free end of the spring curves and the free spring end enjoys a non-friction connection with wheel journaling structure movable toward and away from the abutment surface.

2. Description of Related Art

Various different forms of single spring member suspension systems, semi-elliptical spring suspension systems and other spring suspension systems incorporating some of the general structural and operational features of the instant invention heretofore have been provided. Examples of some of these previously known forms of spring suspension systems are disclosed in U.S. Pat. Nos. 111,103, 1,297,325, 2,009,548, 2,098,522, 4,027,898, 4,313,618 and 4,681,343. However, these previously known forms of spring suspension systems do not include the overall combination of structural features of the instant invention nor are they capable of performing in a similar manner.

SUMMARY OF THE INVENTION

The semi-elliptical spring suspension system of the instant invention is constructed in a manner whereby a variable spring rate is achieved and the spring rate smoothly and progressively increases as more force is applied. With increasing force, the spring contacts the opposing support surface to a greater extent and this, in effect, shortens the spring, providing a progressively higher spring rate.

In combination with this effect, the spring expands on a bearing as it flexes which also shortens the active spring length, enhancing the spring rate increase. This combination of effects results in a suspension that has a soft, comfortable ride at light loads and has the ability to handle heavy loads without bottoming out as a result of a harsh bump.

A further advantage of the spring suspension of the instant invention is the protection it provides to the spring during use against stress. As force is applied and the spring contacts more of the support surface, the load is shared with the surface. Since the spring is not rigidly fixed to the bearing on its free end, it is protected to some extent by being isolated against twisting forces to some degree. The spring also is protected from wind up torque since this stress is absorbed by the trailing arm of the associated axle mounting assembly. Further, side thrust also is lessened.

Another very important aspect of this invention is that the associated trailing arm provides axle location should the spring fail. Loss of axle location can result in a dangerous situation. Since the trailing arm does not have to accommodate axle movement due to expansion of the spring, a direct and strong connection to the axle one end, and a simple articulated connection to the frame or spring encasement housing on the other end is allowed. This enables the use of a strong trailing arm which can be fabricated to provide protection against twisting, side thrust and torque. This provides for a very strong suspension system.

Yet another advantage of the spring suspension of the instant invention is the elimination of a shackle required for most suspension systems to accommodate expansion of the associated spring. Since the spring of the instant invention is not fixed to the axle but rides on a roller bearing, the movement of the axle does not have to accommodate the increase in length of the spring as it straightens out upon flexing with applied force. This allows a direct connection of the associated trailing arm to the axle thereby limiting movement of the axle to an arc prescribed by the trailing arm. This allows much greater spring travel without excessive fore and aft movement of the axle.

A final important aspect of this invention is the fact that the suspension system may be mounted relative a pair of angle irons which may be conveniently secured to longitudinal frame members of a vehicle in any convenient manner, thereby enabling simple bolt-on installation of the suspension on a vehicle frame.

An object of this invention is to provide a simple spring suspension system for a vehicle incorporating a variable rate spring in order to achieve a smooth, progressively greater spring rate as more force is applied.

Another object of this invention is to provide a spring suspension system utilizing a semi-elliptical spring but which is constructed in a manner to isolate the spring to a great degree against twisting forces and wind up torque.

Another very important object of this invention is to provide a spring suspension system capable of being used in severe stress applications, but which utilizes a composite semi-elliptical spring in a manner providing adequate protection to the spring against detrimental operational forces.

Yet another object of this invention is provide a spring suspension system providing positive location of an associated axle independent of the semi-elliptical spring used in the suspension system.

A further object of this invention is to provide a spring suspension system which may be used in tandem axle applications without the use of equalizer bars or beams.

Another very important object of this invention is to provide a spring suspension system for use primarily in conjunction with trailers and which may be manufactured independent of a trailer frame and added to an existing trailer frame merely as a result of a bolt-on operation.

A final object of this invention of this invention to be specifically enumerated herein is to provide a suspension system which will conform to conventional forms of manufacture, be of simple construction and easy to install so as to provide a device that will economically feasible, long-lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
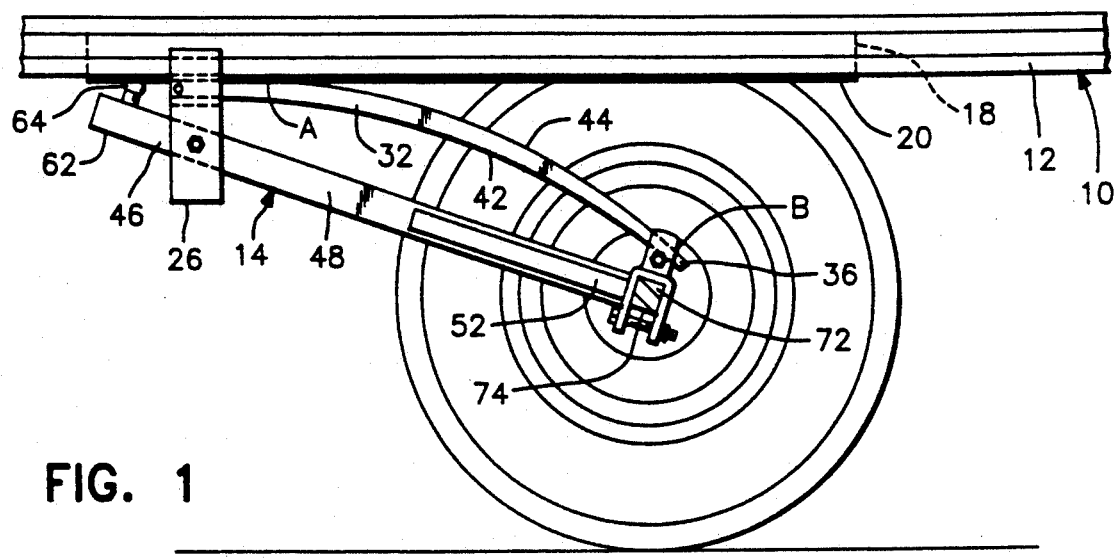
FIG. 1 is a fragmentary longitudinal vertical sectional view of the right hand portion of a semi-elliptical spring suspension system for a trailer and illustrating the suspension system in a substantially non-loaded condition.

Referring now more specifically to the drawings the numeral 10 generally designates a trailer frame including a longitudinal frame member 12 which is generally C-shaped in transverse cross section and whose open side faces inwardly of the frame 10. Of course, the trailer frame 10 includes a pair of opposite side longitudinal frame members 12 which are interconnected by transverse members at points spaced longitudinally along the longitudinal frame members 12.

The suspension system of the instant invention is referred to in general by the reference numeral 14 and includes an angle member 16 including a vertical flange 18 and a horizontal flange 20, the latter defining an elongated horizontal downwardly facing abutment surface 22. The angle member 16 is secured to the longitudinal frame member 12 in any convenient manner (not shown) such as by welding or bolting with the vertical flange 18 abutted against the outer surface of the longitudinal member 12 and the horizontal flange 20 underlying and abutted against the underside of the longitudinal frame member 12.

A pair of vertical side plates 24 and 26 depend downwardly from and are secured to the longitudinal margins of the horizontal flange 20. In addition, the upper end portion of the side plate 24 is secured to the exterior surface of the vertical flange 18 in any convenient manner such as by welding (not shown) and the upper end portion of the side plate 26 also may be welded to the opposing portions of the inner side of the longitudinal frame member 12.

The vertical mid-portions of the side plates 24 and 26 are interconnected by a bracing plate 28 extending and secured therebetween and the bracing plate 28 is slightly angled relative to the horizontal flange 20 in order to define a longitudinally tapering tubular socket or sleeve 30 constituting first mounting means.

A semi-elliptical composite spring 32 includes base and free end portions 34 and 36 and tapers in thickness from the base end portion 34 to the free end portion 36. The base end portion 34 is seated in the tubular socket 30 and a transverse pin or fastener 38 is secured between the side plates 24 and 26 immediately behind the terminal end 40 of the base end portion 34 in order to prevent displacement of the major dimension end of the spring 32 outward of the major dimension end of the tubular socket 30.

The spring 32 includes a concave lower side 42 and a convex upper side 44, the upper side 44 opposing the flat horizontal under surface 22 of the horizontal flange 30 with the free end portion 36 of the spring 32 curving downwardly away from the under surface 22.

The lower end portions of the side plates 24 and 26 pivotally mount a first end portion 46 of an elongated support member or trailing arm 48 therebetween through the utilization of a pivot fastener 50 (24, 26 and 50 comprising second mounting means). The support member 48 includes a second end portion 52 from which a transverse, downwardly opening channel member 54 is supported and the channel member 54 includes a pair of upstanding mounting lugs 56 between which a nylon roller 58 or the like comprising anti-friction abutment means is journaled by a fastener 60. The concave side 42 of the free end portion 36 engages the roller 58.

The terminal end 62 of the first end portion 46 of the support member 48 includes an upwardly facing resilient abutment 64 for engagement with the underside of the horizontal flange 20 to limit downward swinging movement of the channel member 54 relative to the longitudinal frame member 12 and in this position of the support member 48 the semi-elliptical spring 32 is still slightly flexed.

Figure 3:
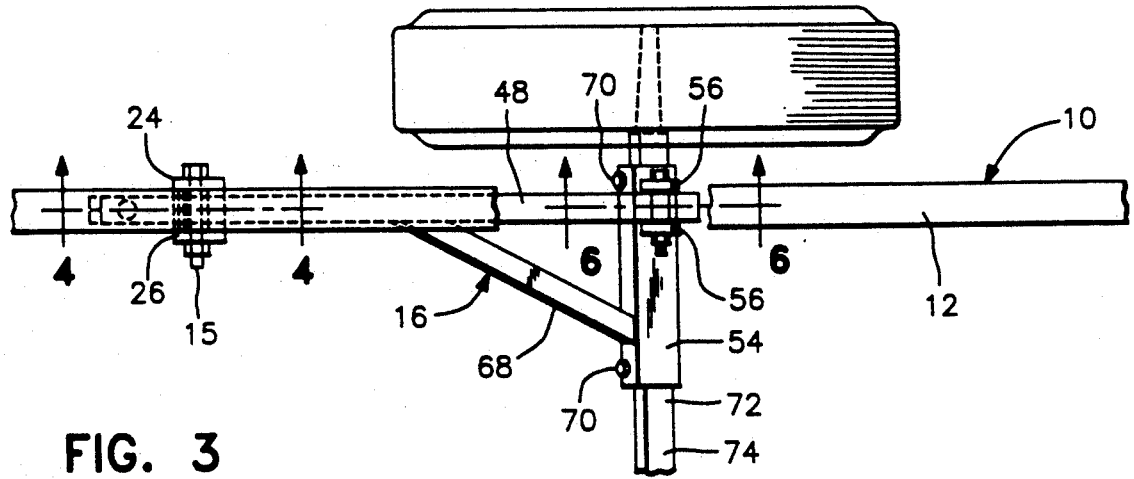
FIG. 3 is an enlarged fragmentary top plan view of the assemblage illustrated in FIGS. 1 and 2.
Figure 4:
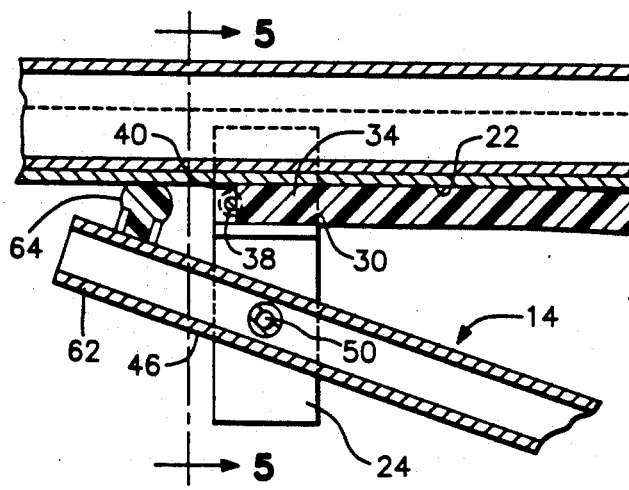
FIG. 4 is a fragmentary enlarged longitudinal vertical sectional view taken substantially upon the plane indicated by the section line 4—4 of FIG. 3.
Figure 5:
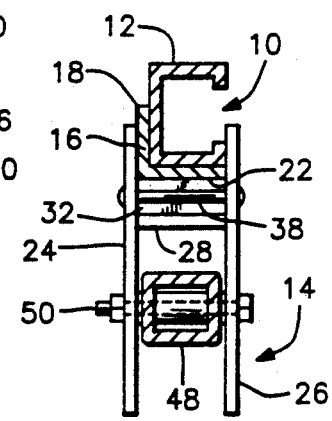
FIG. 5 is a vertical sectional view taken substantially upon the plane indicated by the section line 5—5 of FIG. 4.
Figure 6:
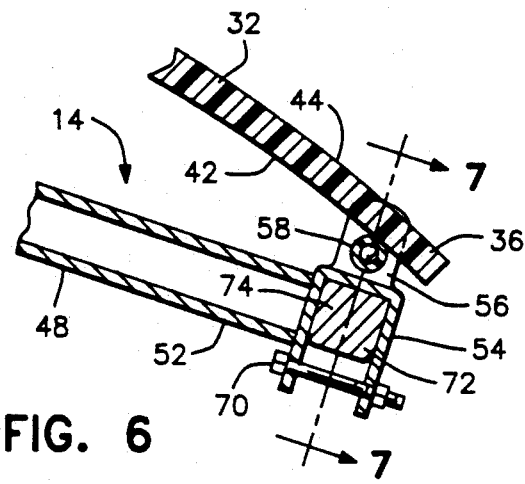
FIG. 6 is an enlarged fragmentary vertical sectional view taken substantially upon the plane indicated by the section line 6—6 of FIG. 3.
Figure 7:
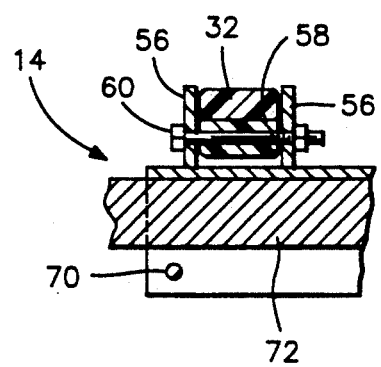
FIG. 7 is a fragmentary vertical sectional view taken substantially upon the plane indicated by the section line 7—7 of FIG. 6.

As can best be seen from the FIG. 3 of the drawings, the mounting ears or lugs 56 are supported from one end of the channel member 54 and a diagonal bracing arm 68 extends and is secured between the other end of the channel member 54 and the longitudinal mid-portion of the support member 48.

As also may be seen from FIG. 3 of the drawings, the opposite ends of the channel member 54 include clamp fasteners 70 which may be utilized to clamp the channel member about the corresponding end portion 72 of a transverse axle beam 74, the other end portion of the transverse axle beam 74 being similarly supported from a channel member 54 (not shown) carried by a corresponding support member or trailing arm mounted from the opposite side longitudinal frame member of the trailer frame 10.

Figure 2:
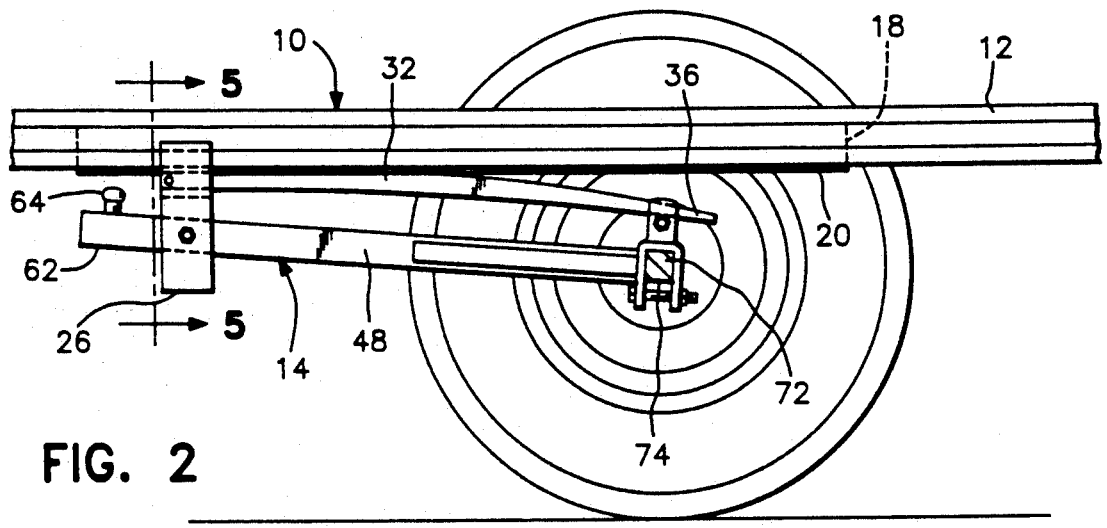
FIG. 2 is a fragmentary longitudinal vertical sectional view similar to FIG. 1 but illustrating the suspension system in a partially loaded condition.
Figure 8:
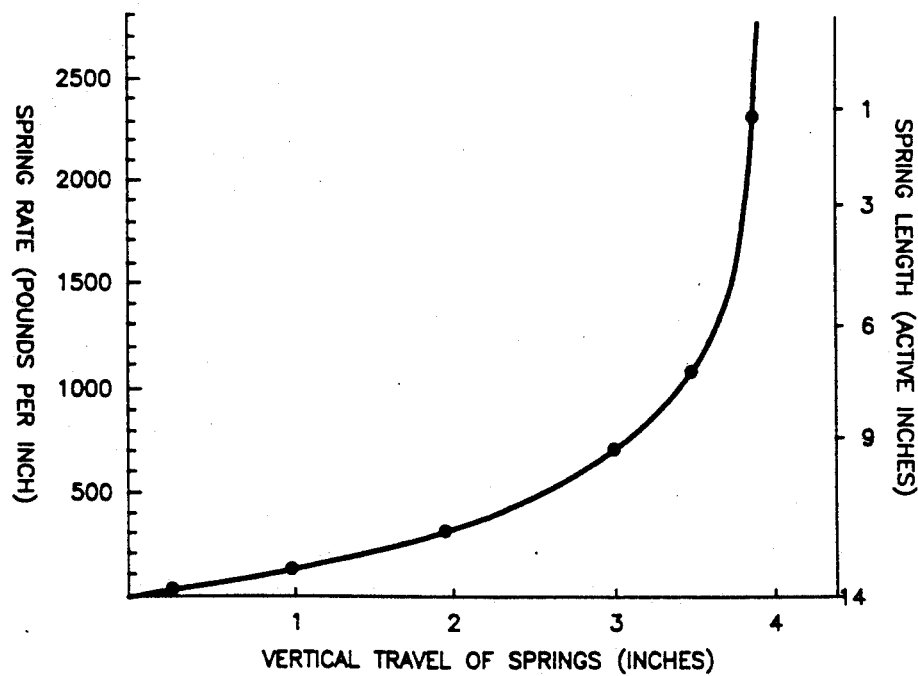
FIG. 8 is a graph illustrating the spring rate change of the spring suspension system a the loading thereon is increased.

With attention now invited more specifically to FIGS. 1 and 2, it may be seen from FIG. 1 that the rear end or second end portion 52 of the support member 48 is disposed in its lowermost position, the resilient abutment 64 carried by the terminal end 62 of the first end portion 46 of the support member 48 being upwardly abutted against the underside of the horizontal flange 20 of the angle member 16. In this condition, the suspension system 14 is supporting substantially no portion of the weight of the trailer frame 10 and the spring 32 is only slightly flexed. In addition, it is to be noted that the active spring length extends from point A to point B and that this length of the spring equals approximately 14 inches. The graph of FIG. 8 indicates that at this active length the spring 32 is supporting substantially no weight.

However, as the spring 32 supports the weight of the trailer frame 10 and a load thereon totaling approximately 2200 pounds, the support member 48 swings to the general position thereof illustrated in FIG. 2 in which the active spring length has been reduced to generally seven inches and the point B on the spring 32 has been displaced approximately three inches upward toward the horizontal flanges 20 of the angle member 16. Thus, the spring rate has been greatly increased (as noted on the graph comprising FIG. 8) and the point B on the spring 32 has only approximately one more inch of vertical travel upward toward the angle member 16. However, during this final upward movement to the upper limit position of the point B on the spring 32, the spring rate in pounds per inch greatly increases.

The increase in spring rate is due to the fact that active spring length is reduced as more and more of the length of the convex side of the spring 32 engages the under surface 22. Also, as the support member 48 is swung from the position thereof illustrated in FIG. 1 to the position thereof illustrated in FIG. 2, the roller 58 moves along the spring 52 from the free end thereof toward the base end portion 34.

Accordingly, the spring 32 experiences a smooth, progressively greater spring rate as more force is applied thereto. In addition, as more force is applied to the spring, the spring contacts more of the surface 22 and the load applied to the spring 32 is shared with the surface 22. Since the spring is not rigidly fixed to the bearing 58 at the free end portion 36, increase contact of the spring 32 with the surface 22 as the load is increased o the spring 32 functions to isolate the spring 32 against twisting forces and to protect the spring 32 from wind up torque.

Inasmuch as the suspension system 14 may be readily attached to the longitudinal side rails of an existing trailer frame, trailer frames may be economically manufactured at one site and compactly shipped to another site at which the suspension system 14 may be readily added to the frame, the transverse axle beams 74 may be either manufactured at the site of assembly, or manufactured at another remote location and also shipped to the site of assembly together with the necessary wheels and tires. In any event, the suspension system 14 of the instant invention may be readily manufactured on a relatively small production line and with a minimum amount of tooling required such that the various components of a trailer such as that illustrated in FIGS. 1-3 may be remotely produced and compactly and economically shipped to a point of assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination, a generally elongated, straight abutment surface, an elongated arcuate and semi-elliptical spring including base and free end portions, said spring including oppositely facing convex and concave longitudinal sides, first mounting means mounting said base end portion stationarily relative to said surface with said convex side opposing and extending along said surface, the convex side of said base end portion being abutted against said surface and the free end portion of said convex side curving away from said surface, an elongated support member having first and second end portions, second mounting means pivotally mounting said first end portion relative to said surface for angular displacement about an axis fixed and extending transverse relative to said support member, abutment surface and spring and spaced outward of said base end portion from said surface with said support member generally paralleling and disposed outward of said concave longitudinal side, said second end portion being disposed totally on the side of said free end portion remote from said abutment surface and being swingable toward and away from said surface and including anti-friction abutment means engaged with said concave side only of said free end portion and movable in an anti-friction manner along said concave side of said free end portion toward said base end portion as said second end portion moves, and forces said fee end portion, toward said surface.

2. The combination of claim 1 wherein said surface is generally horizontal, faces downwardly and extends longitudinally of a vehicle frame, said support member comprising a trailing arm-type wheel suspension member from whose second end portion support wheel journaling means is supported.

3. The combination of claim 2 wherein said vehicle comprises a trailer-type of vehicle and said surface extends along one longitudinal side frame member of said vehicle.

4. The combination of claim 3 wherein said surface comprises the under surface of a horizontal flange of an angle member secured to and extending along said longitudinal side frame member.

5. The combination of claim 1 wherein said first end portion includes a terminal end projecting past said axis in a direction away from said second end portion and includes abutment means thereon opposing and abuttingly engageable with said surface to limit swinging of second end portion away from said surface.

6. The combination of claim 1 wherein said anti-friction abutment means includes a transverse roller journaled from said second end against which said free end portion abuts.

7. The combination of claim 1 wherein said semi-elliptical spring comprises a composite spring.

8. The combination of claim 1 wherein said semi-elliptical spring tapers from said base end portion toward said free portion, said first mounting means defining an elongated, tubular and open ended tapered socket, having minor and major dimension ends, in which said base end portion of said spring is seated with the free end portion of said spring projecting outward of the minor dimension end of said socket, and abutment means carried by said first mounting means preventing movement of said base end portion of said spring outward of the major dimension end of said socket.

9. In combination, an elongated vehicle frame side member including means defining a downwardly facing abutment surface extending longitudinally therealong, and an elongated, arcuate semi-elliptical spring including base and free end portions, said spring including oppositely facing convex and concave longitudinal sides, first mounting means mounting said base end portion stationary relative to and beneath said surface with said convex side opposing and extending along said surface, the convex side of said base end portion being abutted against said surface and free end portion of said convex side curving downwardly away from said surface, an elongated support member having first and second end portions and generally paralleling said spring, second mounting means pivotally mounting said first end portion relative to said surface about an axis fixed and extending transverse to said support member, abutment surfaces and spring and spaced below said base end portion with said support member generally paralleling and disposed beneath said concave longitudinal side, said second end portion being disposed totally on the side of said free end portion remote from said abutment surface and being swingable toward and away from said surface and including anti-friction abutment means engaged with said concave side, only, of said free end portion and movable in an anti-friction manner along said concave side of said free end portion toward said base end portion as said second end moves, and forces said free end portion, toward said surface.

10. The combination of claim 9 wherein said first end portion includes a terminal end projecting past said axis in a direction away from said second end portion and includes upwardly facing abutment means thereon opposing and abuttingly engageable with said surface to limit downward swinging of said second end portion away from said surface.

11. In combination with a generally planar elongated surface, means defining an open ended tubular socket opening in opposite directions along said planar surface and including one side wall inner surface at least substantially co-planar with said planar surface, said socket tapering in one direction along said planar surface and having major and minor dimension open ends, an elongated, semi-elliptical spring including a base end and a free end as well as oppositely facing longitudinally concave and convex first and second longitudinally surfaces extending between said ends, said spring tapering toward said free end with the free end being insert through and beyond said socket in said one direction from said major dimension end to a position with said base end wedgingly seated in said socket, said convex surface of said base end opposing and extending along said inner and planar surfaces and said convex surface of said free end curving outwardly from said planar surface, the concave side, only, of said free end of said spring being adapted to be engaged by a member being advanced toward said planar surface with said spring increasingly resisting movement of said member toward said planar surface, said socket supporting said base end portion stationary to said planar surface, and abutment means stationary with the major dimension end of said socket preventing movement of said base end of said spring outward of said major dimension end of said socket.

* * * * *